(No Model.)

J. C. SCHLEICHER.
CORN PLANTER.

No. 354,939. Patented Dec. 28, 1886.

Witnesses.
J. E. Wakeley.
H. M. Lewis

Inventor.
Joseph C. Schleicher
per C. J. Wakeley
attorney

UNITED STATES PATENT OFFICE.

JOSEPH C. SCHLEICHER, OF SUN PRAIRIE, WISCONSIN, ASSIGNOR OF ONE-HALF TO BERNARD A. O'KEEFE, OF SAME PLACE.

CORN-PLANTER.

SPECIFICATION forming part of Letters Patent No. 354,939, dated December 28, 1886.

Application filed April 26, 1886. Serial No. 200,231. (No model.)

*To all whom it may concern:*

Be it known that I, JOSEPH C. SCHLEICHER, a citizen of the United States, residing at Sun Prairie, in the county of Dane and State of Wisconsin, have invented a new and useful Corn-Planter, of which the following is a specification.

My invention relates to improvements in corn-planters; and the object of my improvement is to construct a corn-planter to be worked by horse-power in such a manner that it will be a perfect self-marker of the rows both ways and will automatically plant such seed in true check-rows corresponding with such markings. I attain this object by the mechanism illustrated in the accompanying drawings, in which—

Figure 1:
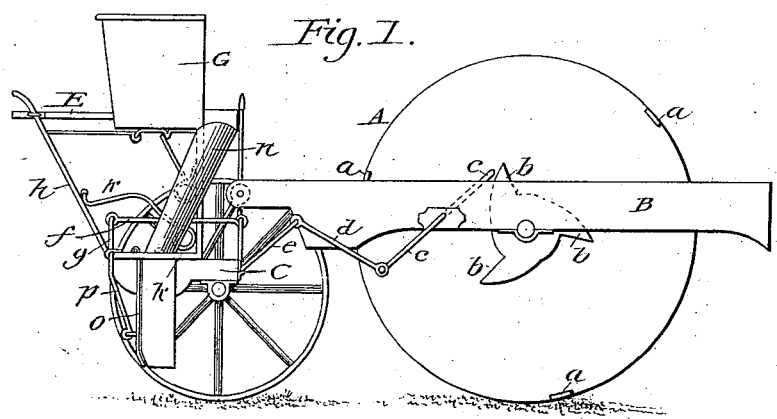
Figure 2:
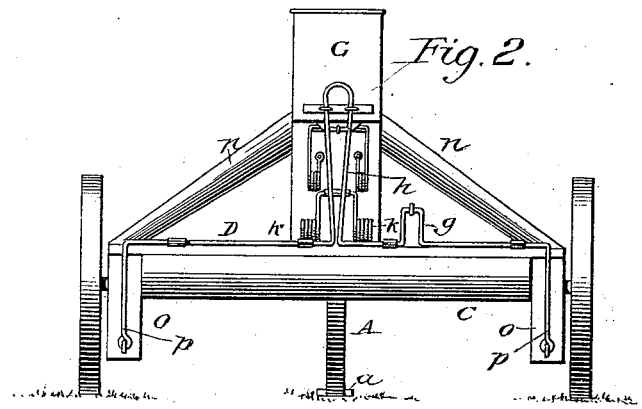
Figure 3:
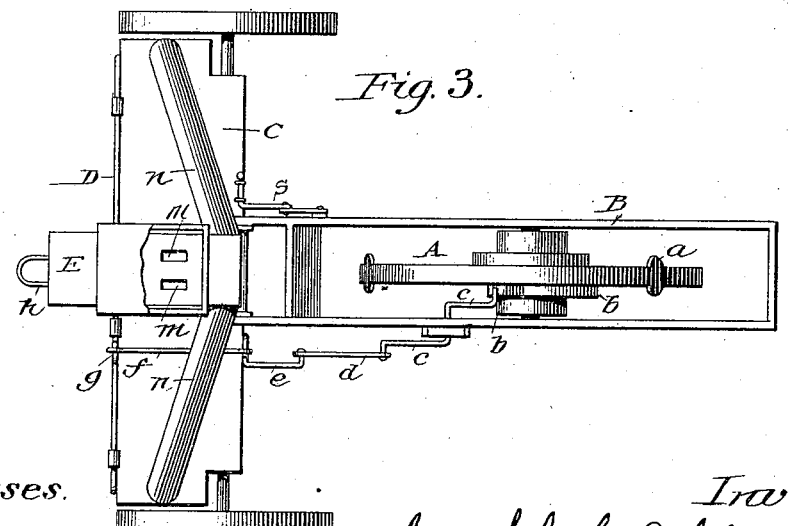

Figure 1 is a side view with part of frame removed. Fig. 2 is a front view, and Fig. 3 is a top view.

Similar letters refer to similar parts throughout the several views.

I construct the wheel A, which, with attachments, is a marker of the distance of the hills in rows, and, in the particulars hereinafter mentioned, is also a drive-wheel of the dropping machinery. The wheel A has its axle journaled in a frame, B, which is jointed centrally to the rear of the cross-frame C, placed upon the running gear of any ordinary planter. Into the rims of such wheel, at distances equal and proper for hills, I insert the three cross-blocks a, widening the tracking-surface at those points as a guide to the eye of the driver or operator in setting the wheel in the following rows.

To operate the dropper, I fasten to the left side of the wheel A the three cams b, faced forward, each extending from near the center toward the circumference at equal distances from each other. Each cam as the wheel revolves engages in turn with and drives upward and forward the rear end of the crank c, the middle bend of which is journaled laterally through the frame B, the forward end connecting by means of the rod d with the rear of the crank e, which is pivoted to the top of the cross-frame C, the front arm of which crank e is connected by the rod f with the upward loop, g, of the shaft D, which is pivoted to the front edge of the cross-frame C. The second upward loop, h, of the shaft D is attached to the slide E, working in the bottom of the hopper G, placed to its rear. The slide E has near its rear end the two mortises m, each of which carries the seed for a hill. The slide is thus thrown back through a suitable door in the rear side of the hopper, and the charge of seed is dropped from each mortise into one of the two spouts n, extending outward and downward on each side and terminating by a downward vertical bend near the ground, where it is closed by a lid, o, opening to the front, attached to each of which lids is a lever, p, formed by a vertical downward bend of the end of the shaft D, so that the lid will be opened thereby for the final dropping of the seed. The slide E and all parts of the shaft D are thrown back to normal position by the spiral springs k, placed on the frame C and bearing against the rear side of the loop h.

The frame may carry two teeth, making furrows in advance of seed, and also a marker for the next drive across the field. The supporting-wheels of the planter may pass over the hills, covering the seed. For adjusting the wheel A, its frame B is raised by the bent lever S, passing therefrom, pivoted to the cross-frame C, and having the front arm rise to the right of driver. Attached to the slide E, and lying below the bottom of the hopper G, I have a plate to receive the seed when it is first dropped, whence it is thrown by edge of hopper into the spouts when the slide is thrown forward to place, a plate being attached to slide E.

I am aware that prior to my invention one of the two supporting-wheels of planters has carried cams and hill-markers resembling mine. I do not, therefore, claim such wheel, broadly; but I am not aware that a third wheel, constructed like mine and attached to the planter, working independently of and tracking and marking away from the other wheels, has been used.

What I claim as my invention, and desire to secure by Letters Patent, is—

The combination, in a corn-planter, of the third wheel, A, having the cross-blocks a and the cams b, with the two cranks c e, the two rods d f, the loops g h, the levers p, and the slide E, all substantially as set forth.

JOSEPH C. SCHLEICHER.

Witnesses:
C. T. WAKELEY,
FRANK E. PARKINSON.